United States Patent
Ivakitch et al.

(10) Patent No.: US 12,504,029 B2
(45) Date of Patent: Dec. 23, 2025

(54) AEROSPACE ACTUATOR STROKE LIMITING DEVICE

(71) Applicant: Pratt & Whitney Canada Corp., Longueuil (CA)

(72) Inventors: Richard Ivakitch, Scarborough (CA); Milica Kojovic, Oakville (CA)

(73) Assignee: PRATT & WHITNEY CANADA CORP., Longueuil (CA)

( * ) Notice: Subject to any disclaimer, the term of this patent is extended or adjusted under 35 U.S.C. 154(b) by 0 days.

(21) Appl. No.: 18/582,316

(22) Filed: Feb. 20, 2024

(65) Prior Publication Data

US 2025/0264120 A1    Aug. 21, 2025

(51) Int. Cl.
*F15B 15/24*    (2006.01)

(52) U.S. Cl.
CPC .................................. *F15B 15/24* (2013.01)

(58) Field of Classification Search
CPC ...................................................... F15B 15/24
See application file for complete search history.

(56) References Cited

U.S. PATENT DOCUMENTS

| | | | |
|---|---|---|---|
| 3,003,470 A | | 10/1961 | Geyer |
| 3,080,852 A | * | 3/1963 | Geyer ............... F15B 15/24 92/136 |
| 3,407,710 A | * | 10/1968 | Weiss ............... B30B 15/18 92/13.8 |
| 3,915,062 A | | 10/1975 | Westfall et al. |
| 4,152,936 A | | 5/1979 | Boykin et al. |
| 4,224,858 A | * | 9/1980 | Tsuchiyama ........... B30B 15/18 91/410 |

(Continued)

FOREIGN PATENT DOCUMENTS

| CN | 205780010 U | 12/2016 |
|---|---|---|
| FR | 2503283 A1 | 10/1982 |

(Continued)

OTHER PUBLICATIONS

Search Report issued in European Patent Application No. 25158951.1; Date of Mailing Jul. 17, 2025 (9 pages).

*Primary Examiner* — Matthew Wiblin
(74) *Attorney, Agent, or Firm* — CANTOR COLBURN LLP (57) ABSTRACT

An aerospace actuator is provided and includes an actuator housing, second and third parts respectively including retraction-limiting and extension-limiting surfaces, a piston and a stroke limiting device. The piston is movable within the actuator housing between a retraction-limited position where the piston impinges against the retraction-limiting surface and an extension-limited position where the piston impinges against the extension-limiting surface. The stroke limiting device includes at least one of a first adjustable engagement unit and a second adjustable engagement unit. The first adjustable engagement unit is disposed between the actuator housing and the second part for adjusting a first distance between the actuator housing and the retraction-limiting surface. The second adjustable engagement unit is disposed between the second part and the third part for adjusting a second distance between the extension-limiting surface and the retraction-limiting surface.

15 Claims, 4 Drawing Sheets

(56) References Cited

U.S. PATENT DOCUMENTS

| | | | |
|---|---|---|---|
| 4,984,508 A * | 1/1991 | Muller | F15B 15/24 |
| | | | 92/57 |
| 5,133,245 A | 7/1992 | Lee et al. | |
| 5,320,499 A | 6/1994 | Hamey et al. | |
| 5,429,217 A | 7/1995 | Stringer et al. | |
| 5,960,674 A | 10/1999 | Brockmeyer | |
| 6,814,338 B2 | 11/2004 | Kajitani | |
| 7,163,194 B2 | 1/2007 | Pervaiz | |
| 7,594,466 B2 | 9/2009 | Guay et al. | |
| 8,690,521 B2 | 4/2014 | Colotte et al. | |
| 8,960,031 B2 * | 2/2015 | Keech | F16H 25/205 |
| | | | 244/99.3 |
| 9,163,649 B2 | 10/2015 | Casavant et al. | |
| 9,415,880 B2 | 8/2016 | Russ et al. | |
| 9,651,053 B2 | 5/2017 | Eleftheriou et al. | |
| 9,951,643 B2 | 4/2018 | Duguay | |
| 10,543,901 B2 | 1/2020 | Miskiewicz et al. | |
| 2006/0169132 A1 | 8/2006 | Tucker | |
| 2014/0102290 A1 * | 4/2014 | Casavant | F15B 15/24 |
| | | | 188/67 |
| 2019/0309774 A1 * | 10/2019 | Mezzino | B64C 13/40 |

FOREIGN PATENT DOCUMENTS

| | | |
|---|---|---|
| JP | S58207508 A | 12/1983 |
| WO | 2016014141 A3 | 3/2016 |

\* cited by examiner

AEROSPACE ACTUATOR STROKE LIMITING DEVICE

BACKGROUND

Exemplary embodiments of the present disclosure relate generally to actuators and, in some embodiments, to an aerospace actuator with an actuator stroke limiting device.

An actuator is a component of a machine that produces force, torque or displacement, usually in a controlled way, when an electrical, pneumatic or hydraulic input is supplied to it in a system. The actuator converts such an input signal into the required form of mechanical energy. Often, an actuator may require a control device (controlled by a control signal) and a source of energy. The control signal can be electric voltage or current, pneumatic or hydraulic fluid pressure. An achieved displacement is commonly linear or rotational, as exemplified by linear motors and rotary motors, respectively.

A continuing need exists for improvements in actuators and improvements in making actuators increasingly useful and reliable.

BRIEF DESCRIPTION

According to an aspect of the disclosure, an aerospace actuator is provided and includes an actuator housing, second and third parts respectively including retraction-limiting and extension-limiting surfaces, a piston and a stroke limiting device. The piston is movable within the actuator housing between a retraction-limited position where the piston impinges against the retraction-limiting surface and an extension-limited position where the piston impinges against the extension-limiting surface. The stroke limiting device includes at least one of a first adjustable engagement unit and a second adjustable engagement unit. The first adjustable engagement unit is disposed between the actuator housing and the second part for adjusting a first distance between the actuator housing and the retraction-limiting surface. The second adjustable engagement unit is disposed between the second part and the third part for adjusting a second distance between the extension-limiting surface and the retraction-limiting surface.

In accordance with additional or alternative embodiments, the aerospace actuator is a hydraulic or pneumatic aerospace actuator and the piston is moved between the retraction-limited position and the extension-limited position by hydraulic or pneumatic pressure of oil or air and the aerospace actuator further includes a seal interposed between the actuator housing and the piston.

In accordance with additional or alternative embodiments, the piston includes a shaft and a shoulder extending outwardly from the shaft and the shoulder impinges against the retraction-limiting surface at the retraction-limited position and against the extension-limiting surface at the extension-limited position.

In accordance with additional or alternative embodiments, the stroke limiting device includes the first adjustable engagement unit and the second adjustable engagement unit.

In accordance with additional or alternative embodiments, the first adjustable engagement unit includes first exterior threading disposed on an exterior surface of the actuator housing and first interior threading disposed on an interior surface of the second part and the first exterior threading and the first interior threading are threadably engageable with one another to adjust the first distance between the actuator housing and the retraction-limiting surface.

In accordance with additional or alternative embodiments, the first adjustable engagement unit further includes a first adjustment limiter to define a maximum of the first distance.

In accordance with additional or alternative embodiments, the second adjustable engagement unit includes second exterior threading disposed on an exterior surface of the second part and second interior threading disposed on an interior surface of the third part and the second exterior threading and the second interior threading are threadably engageable with one another to adjust the second distance between the extension-limiting surface and the retraction-limiting surface.

In accordance with additional or alternative embodiments, the second adjustable engagement unit further includes a second adjustment limiter to define a maximum of the second distance.

According to an aspect of the disclosure, an aerospace actuator is provided and includes an actuator housing, second and third parts respectively including retraction-limiting and extension-limiting surfaces, a piston and a stroke limiting device. The piston is movable within the actuator housing between a retraction-limited position where the piston impinges against the retraction-limiting surface and an extension-limited position where the piston impinges against the extension-limiting surface. The stroke limiting device includes at least one of a first automatic adjustable engagement unit and a second automatic adjustable engagement unit. The first automatic adjustable engagement unit is disposed between the actuator housing and the second part for automatically adjusting a first distance between the actuator housing and the retraction-limiting surface. The second automatic adjustable engagement unit is disposed between the second part and the third part for automatically adjusting a second distance between the extension-limiting surface and the retraction-limiting.

In accordance with additional or alternative embodiments, the aerospace actuator is a hydraulic or pneumatic aerospace actuator and the piston is moved between the retraction-limited position and the extension-limited position by hydraulic or pneumatic pressure of oil or air and the aerospace actuator further includes a seal interposed between the actuator housing and the piston.

In accordance with additional or alternative embodiments, the piston includes a shaft and a shoulder extending outwardly from the shaft and the shoulder impinges against the retraction-limiting surface at the retraction-limited position and against the extension-limiting surface at the extension-limited position.

In accordance with additional or alternative embodiments, the stroke limiting device includes the first automatic adjustable engagement unit and the second automatic adjustable engagement unit.

In accordance with additional or alternative embodiments, the first automatic adjustable engagement unit includes a first electromechanical motor operably coupled to the actuator housing and the second part and configured to automatically adjust the first distance between the actuator housing and the retraction-limiting surface and the second automatic adjustable engagement unit includes a second electromechanical motor operably coupled to the second part and the third part and configured to automatically adjust the second distance between the extension-limiting surface and the retraction-limiting surface.

In accordance with additional or alternative embodiments, at least one of the first electromechanical motor and the second electromechanical motor includes at least one of a rotary motor and a solenoid.

In accordance with additional or alternative embodiments, a controller is disposed in signal communication with the first and second electromechanical motors and configured to control respective operations of the first and second electromechanical motors.

According to an aspect of the disclosure, a method of installing an aerospace actuator in a system is provided. The method includes assembling the aerospace actuator to include an actuator housing, second and third parts respectively including retraction-limiting and extension-limiting surfaces and a piston movable within the actuator housing between a retraction-limited position where the piston impinges against the retraction-limiting surface and an extension-limited position where the piston impinges against the extension-limiting surface. The method further includes determining a capacity of components in the system and matching a capacity of the aerospace actuator to the capacity of the components by adjusting at least one of a first distance between the actuator housing and the retraction-limiting surface and a second distance between the extension-limiting surface and the retraction-limiting surface.

In accordance with additional or alternative embodiments, the adjusting of the at least one of the first distance and the second distance includes a manual adjustment.

In accordance with additional or alternative embodiments, the adjusting of the at least one of the first distance and the second distance includes an electromechanical adjustment.

In accordance with additional or alternative embodiments, the adjusting of the at least one of the first distance and the second distance includes setting the first distance at one of a baseline first distance and an alternative first distance in accordance with ambient temperature conditions and setting the second distance at one of a baseline second distance and an alternative second distance in accordance with the ambient temperature conditions.

In accordance with additional or alternative embodiments, the method further includes readjusting the at least one of the first distance and the second distance in accordance with ambient conditions.

These and other advantages and features will become more apparent from the following description taken in conjunction with the drawings.

BRIEF DESCRIPTION OF THE DRAWINGS

The following descriptions should not be considered limiting in any way. With reference to the accompanying drawings, like elements are numbered alike.

These and other advantages and features will become more apparent from the following description taken in conjunction with the drawings.

DETAILED DESCRIPTION

A detailed description of one or more embodiments of the disclosed apparatus and method are presented herein by way of exemplification and not limitation with reference to the Figures.

Hydraulic and pneumatic actuators are commonly used to drive aircraft mechanical systems like bleed off valves (BOVs) and variable guide vanes (VGVs). In a given case, the actuator is typically sized to ensure that necessary power to drive the system is available at the worst engine condition when the driving fluid pressure is at its lowest level. As such, it is often the case that under normal operating conditions the actuator has more capacity than required to drive the system. In an exemplary case, an actuator may require 20 lbs to operate a VGV system but may be able to deliver 300 lbs under normal conditions.

In many situations, if the actuator were to fail and extend or retract to its maximum travel distance, the actuator could damage the components that the actuator is moving. This is because those components may not have been designed to withstand a full actuator load at the extent of the travel distance. Indeed, it is not always possible to design these components to be robust enough to handle the large forces associated with full actuator travel or build in enough travel in the system to cater for the maximum extents of the actuator stroke.

As will be described below, a stroke limiting device is provided for use with an aerospace actuator. The stroke limiting device allows for actuator adjustment once the aerospace actuator is installed in a system. This adjustment effectively limits a stroke of the aerospace actuator in both the extend and retract positions, thus preventing undue load on the mechanism that the aerospace actuator is moving.

Figure 1:
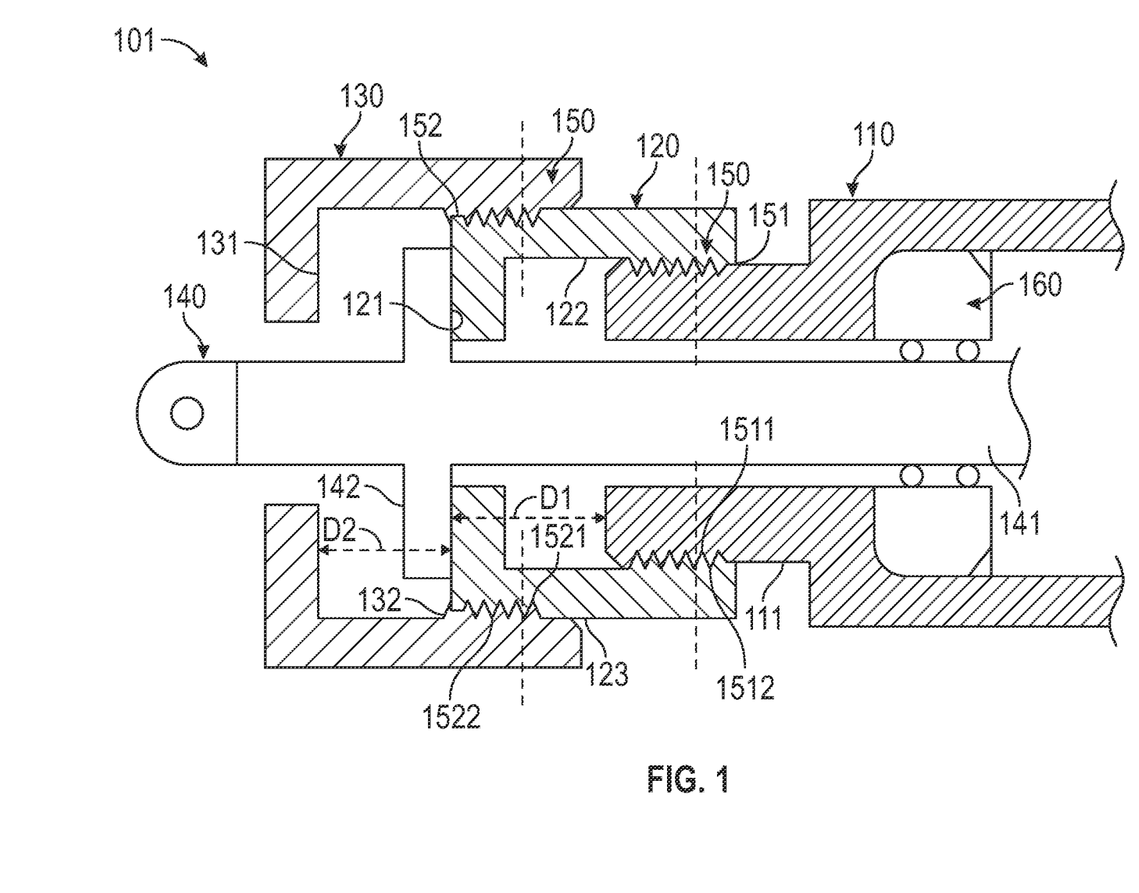
FIG. 1 is a side schematic view of an aerospace actuator with a stroke limiting device including first and second adjustable engagement units in accordance with embodiments.

With reference to FIG. 1, an aerospace actuator 101 is provided and includes an actuator housing 110, a second part 120 including a retraction-limiting surface 121, a third part 130 including an extension-limiting surface 131, a piston 140 and a stroke limiting device 150. The piston 140 includes a shaft 141 and a shoulder 142 that extends outwardly from the shaft 141. The piston 140 is movable within the actuator housing 110 between a retraction-limited position at which the shoulder 142 of the piston 140 impinges against the retraction-limiting surface 121 of the second part and an extension-limited position at which the shoulder 142 of the piston 140 impinges against the extension-limiting surface 131 of the third part 130.

The stroke limiting device 150 includes at least one of a first adjustable engagement unit 151 and a second adjustable engagement unit 152 (for purposes of clarity and brevity, the following description will relate to the case of the stroke limiting device 150 including both the first adjustable engagement unit 151 and the second adjustable engagement unit 152; this will be true as well for the stroke limiting device 450 to be described below).

The first adjustable engagement unit 151 is disposed between the actuator housing 110 and the second part 120 and is manually or automatically operable to adjust a first distance D1 between the actuator housing 110 and the retraction-limiting surface 121 of the second part 120. In accordance with embodiments, the first adjustable engagement unit 151 can include first exterior threading 1511 disposed on an exterior surface 111 of the actuator housing 110 and first interior threading 1512 disposed on an interior surface 122 of the second part 120. The first exterior threading 1511 and the first interior threading 1512 are threadably engageable with one another to adjust the first distance D1 by relative rotation between the second part 120 and the actuator housing 110.

The second adjustable engagement unit 152 is disposed between the second part 120 and the third part 130 and is manually or automatically operable to adjust a second distance D2 between the extension-limiting surface 131 of the third part 130 and the retraction-limiting surface 121 of the second part 120. In accordance with embodiments, the second adjustable engagement unit 152 can include second exterior threading 1521 disposed on an exterior surface 123 of the second part 120 and second interior threading 1522 disposed on an interior surface 132 of the third part 130. The second exterior threading 1521 and the second interior threading 1522 are threadably engageable with one another to adjust the second distance D2 by relative rotation between the third part 130 and the second part 120.

While the first adjustable engagement unit 151 and the second adjustable engagement unit 152 are described above as being threaded, it is to be understood that this is not required and that other configurations are possible. These include, but are not limited to, configurations in which the first adjustable engagement unit 151 and the second adjustable engagement unit 152 include sliding features with or without key engagement features. The following description will relate to the exemplary case of the first adjustable engagement unit 151 and the second adjustable engagement unit 152 being threaded, however, for purposes of clarity and brevity.

In accordance with embodiments, the aerospace actuator 101 can be provided as a hydraulic or pneumatic aerospace actuator and the piston 140 is moved between the retraction-limited position and the extension-limited position by hydraulic or pneumatic pressure of oil or air. In these or other cases, the aerospace actuator 101 can further include a seal 160 that is interposed between the actuator housing 110 and the shaft 141 of the piston 140.

Figure 2:
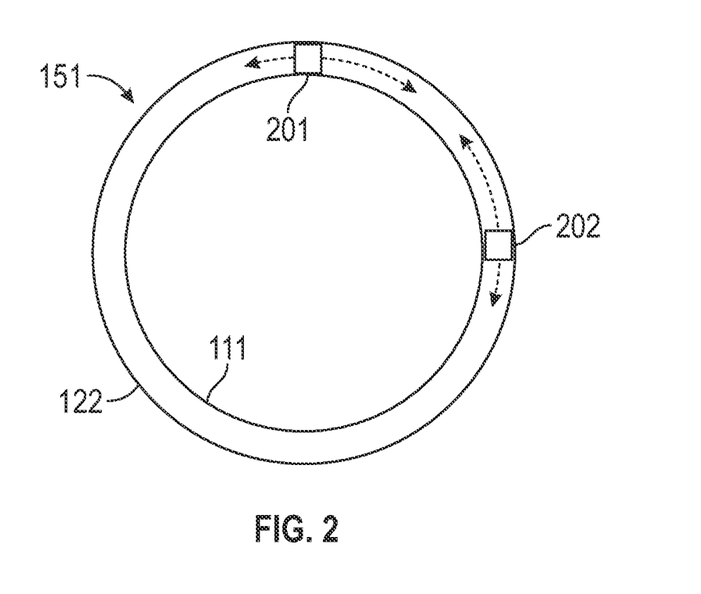
FIG. 2 is an axial schematic view of adjustment limiters of the first adjustable engagement unit of the stroke limiting device of the aerospace actuator of FIG. 1 in accordance with embodiments.
Figure 3:
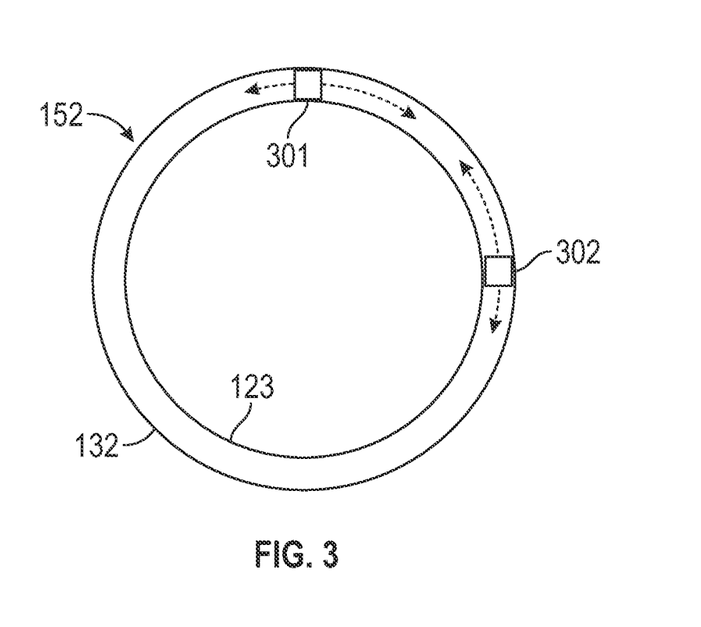
FIG. 3 is an axial schematic view of adjustment limiters of the second adjustable engagement unit of the stroke limiting device of the aerospace actuator of FIG. 1 in accordance with embodiments.

With continued reference to FIG. 1 and with additional reference to FIGS. 2 and 3, the first adjustable engagement unit 151 can further include a first and second adjustment limiters 201 and 202 as shown in FIG. 2 to define a maximum value of the first distance D1 (see FIG. 1) and the second adjustable engagement unit 152 can further include first and second adjustment limiters 301 and 302 as shown in FIG. 3 to define a maximum value of the second distance D2 (see FIG. 1). For the first adjustable engagement unit 151, the first and second adjustment limiters 201 and 202 can take the form of a pair of bosses set in the corresponding threading for mechanical interference that prevents relative rotation between the second part 120 and the actuator housing 110 beyond a certain point. By preventing such relative rotation, axial movement of the second part 120 relative to the actuator housing 110 beyond a certain distance will be correspondingly prevented. For the second adjustable engagement unit 152, the first and second adjustment limiters 301 and 302 can take the form of a pair of bosses set in the corresponding threading for mechanical interference that prevents relative rotation between the third part 130 and the second part 120 beyond a certain point. By preventing such relative rotation, axial movement of the third part 130 relative to the second part 120 beyond a certain distance will be correspondingly prevented.

Figure 4:
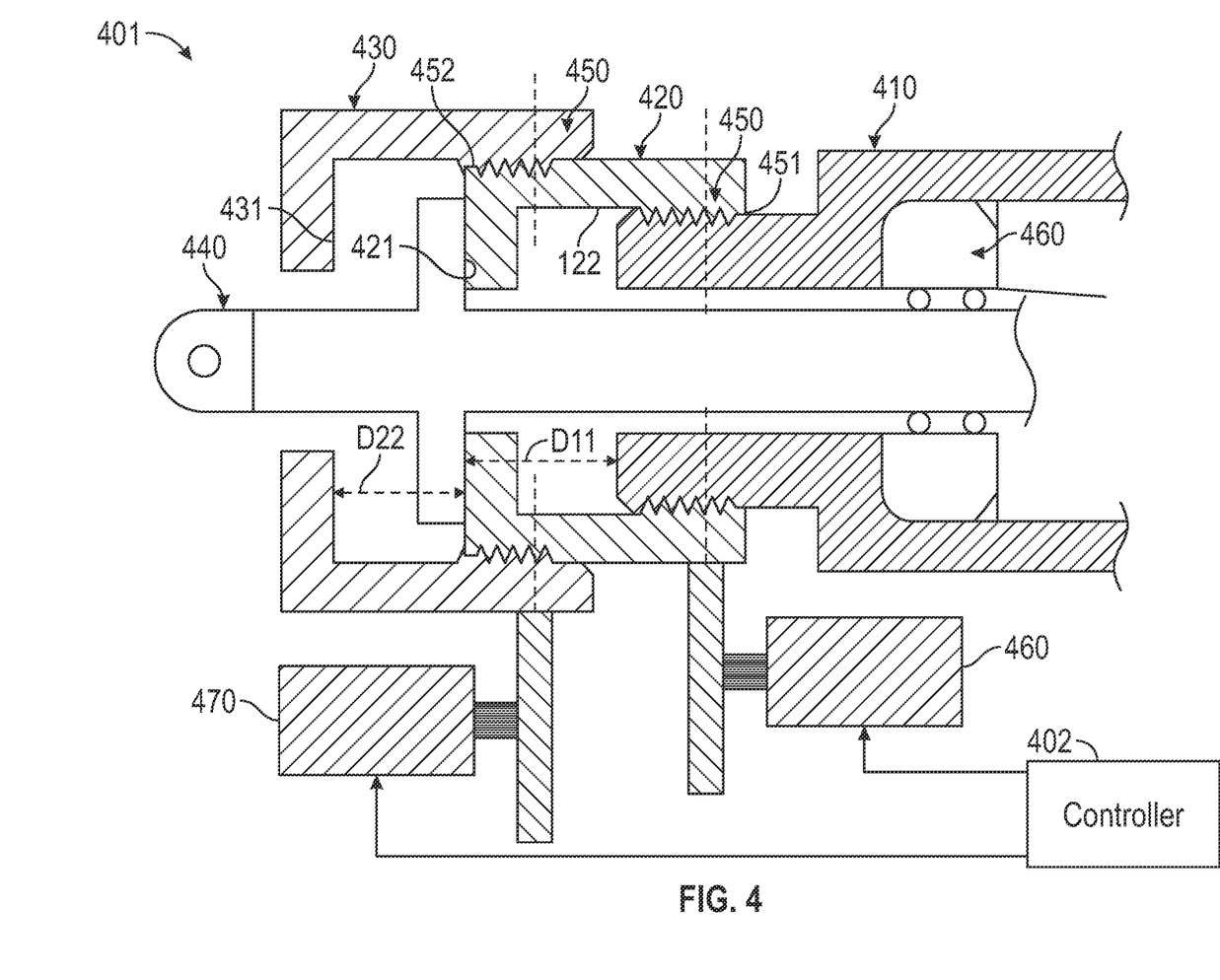
FIG. 4 is a side schematic view of an actuator with a stroke limiting device including first and second automatic adjustable engagement units in accordance with embodiments.

With reference to FIG. 4, an aerospace actuator 401 is provided. The aerospace actuator 401 is generally similar to the aerospace actuator 101 of FIG. 1 and those elements of the aerospace actuator 401 that have already been described in detail above will not be described again.

The aerospace actuator 401 includes an actuator housing 410, a second part 420 including a retraction-limiting surface 421, a third part 430 including an extension-limiting surface 431, a piston 440, a stroke limiting device 450 and a seal 460. The piston 440 is movable within the actuator housing 410 between a retraction-limited position at which the piston 440 impinges against the retraction-limiting surface 421 and an extension-limited position at which the piston 440 impinges against the extension-limiting surface 431. The stroke limiting device 450 includes a first automatic adjustable engagement unit 451 and a second automatic adjustable engagement unit 452. The first automatic adjustable engagement unit 451 is disposed between the actuator housing 410 and the second part 420 by which a first distance D11 between the actuator housing 410 and the retraction-limiting surface 421 is automatically adjustable. The second automatic adjustable engagement unit 452 is disposed between the second part 420 and the third part 430 by which a second distance D22 between the extension-limiting surface 431 and the retraction-limiting surface 421 is automatically adjustable.

The first automatic adjustable engagement unit 451 can include a first electromechanical motor 460. The first electromechanical motor 460 can include or be provided as at least one of a rotary motor and a solenoid. In either case, the first electromechanical motor 460 is operably coupled to the actuator housing 410 and to the second part 420 and is configured to automatically adjust the first distance D11. The second automatic adjustable engagement unit 452 can include a second electromechanical motor 470. The second electromechanical motor 470 can include or be provided as at least one of a rotary motor and a solenoid. In either case, the second electromechanical motor 470 is operably coupled to the second part 420 and to the third part 430 and is configured to automatically adjust the second distance D22.

The aerospace actuator 401 can further include a controller 402. The controller 402 is disposed in signal communication with the first electromechanical motor 460 and with the second electromechanical motor 470 and is configured to control respective operations of the first electromechanical motor 460 and the second electromechanical motor 470. For example, the controller 402 can automatically cease adjustments of the first distance D11 and the second distance D22 at respective maximum values thereof. The controller 402 can also adjust the first distance D11 and the second distance D22 in accordance with ambient conditions (i.e., ambient temperature conditions).

Figure 5:
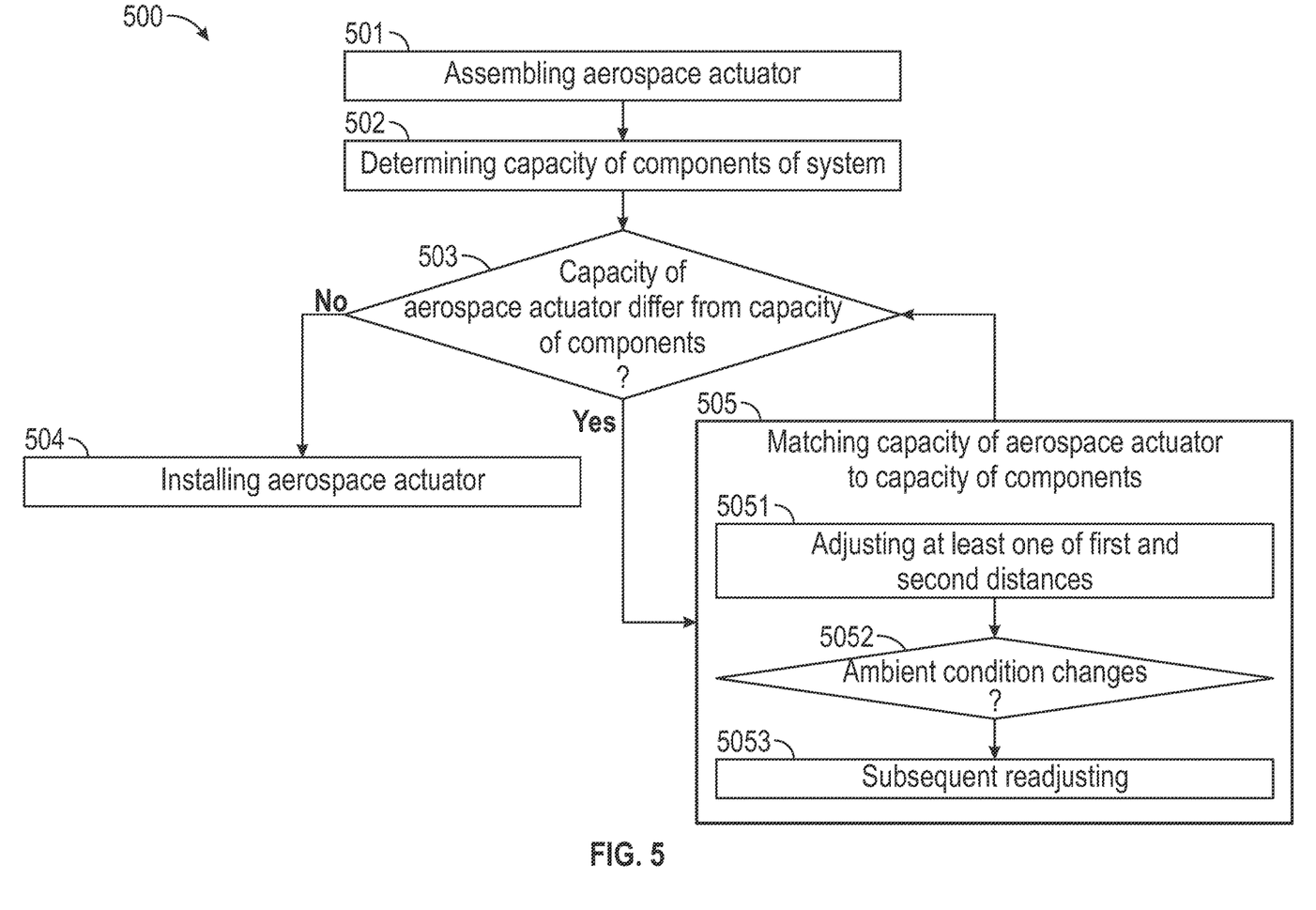
FIG. 5 is a flow diagram illustrating a method of installing an aerospace actuator in a system in accordance with embodiments.

With reference to FIG. 5, a method 500 of installing an aerospace actuator, such as the aerospace actuator 101 of FIG. 1 and/or the aerospace actuator 401 of FIG. 4, in a system is provided. The method 500 initially includes assembling the aerospace actuator to include the various features described above (block 501), determining a capacity of components in the system (block 502) and determining whether a capacity of the aerospace actuator differs from the capacity of the components by at least predefined degree (block 503). In an event the capacity of the aerospace actuator does not differ from the capacity of the components by at least the predefined degree, the method 500 further includes installing the aerospace actuator as is in the system (block 504). In an event the capacity of the aerospace actuator does differ from the capacity of the components by at least the predefined degree, the method 500 includes matching a capacity of the aerospace actuator to the capacity of the components (block 505) by adjusting (e.g., by a manual adjustment or by an electromechanical adjustment) at least one of a first distance between the actuator housing and the retraction-limiting surface and a second distance between the extension-limiting surface and the retraction-limiting surface (block 5051). Following the matching of the capacity of the aerospace actuator to the capacity of the components, control proceeds to the determining of block 503.

In accordance with embodiments, the adjusting of the at least one of the first distance and the second distance of block 5051 can include setting the first distance at one of a baseline first distance and an alternative first distance in accordance with ambient temperature conditions and setting the second distance at one of a baseline second distance and an alternative second distance in accordance with the ambient temperature conditions in order to account for thermal expansion and/or retraction of the various features of the aerospace actuator and the components of the system. In accordance with further embodiments, the method 500 can also include determining whether ambient conditions have changed over time (block 5052) and, if so, subsequently readjusting the at least one of the first distance and the second distance in accordance with such ambient condition changes (block 5053).

Technical effects and benefits of the features described herein are the provision of an aerospace actuator with a stroke limiting device. The stroke limiting device will allow for actuator adjustment, which will be less costly and result in a relatively lightweight system as compared to the cost and increased weight associated with strengthening other components in the system. In those cases, where the system has small parts that cannot be increased in size or strength, the stroke limiting device will allow for aerospace actuator adjustment that would not be possible otherwise.

The term "about" is intended to include the degree of error associated with measurement of the particular quantity based upon the equipment available at the time of filing the application.

The terminology used herein is for the purpose of describing particular embodiments only and is not intended to be limiting of the present disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

While the present disclosure has been described with reference to an exemplary embodiment or embodiments, it will be understood by those skilled in the art that various changes may be made and equivalents may be substituted for elements thereof without departing from the scope of the present disclosure. In addition, many modifications may be made to adapt a particular situation or material to the teachings of the present disclosure without departing from the essential scope thereof. Therefore, it is intended that the present disclosure not be limited to the particular embodiment disclosed as the best mode contemplated for carrying out this present disclosure, but that the present disclosure will include all embodiments falling within the scope of the claims.

What is claimed is:

1. An aerospace actuator, comprising:
    an actuator housing comprising a first exterior surface and first exterior threading disposed on the first exterior surface;
    a second part comprising a retraction-limiting surface, a first interior surface, first interior threading disposed on the first interior surface, a second exterior surface and second exterior threading disposed on the second exterior surface, both the second exterior surface and the second exterior threading being outside of both the first interior surface and the first interior threading;
    a third part comprising an extension-limiting surface, a second interior surface and second interior threading disposed on the second interior surface;
    a piston movable within the actuator housing between a retraction-limited position where the piston impinges against the retraction-limiting surface and an extension-limited position where the piston impinges against the extension-limiting surface; and
    a stroke limiting device comprising:
    a first adjustable engagement unit comprising an engagement of the first exterior threading and the first interior threading to adjust a first distance between the actuator housing and the retraction-limiting surface; and
    a second adjustable engagement unit comprising an engagement of the second exterior threading and the second interior threading to adjust a second distance between the extension-limiting surface and the retraction-limiting surface,
    wherein:
    an adjustment of the first distance by the first adjustable engagement unit is independent of an adjustment of the second distance by the second adjustable engagement unit, and
    the adjustment of the second distance by the second adjustable engagement unit is independent of the adjustment of the first distance by the first adjustable engagement unit.

2. The aerospace actuator according to claim 1, wherein:
    the aerospace actuator is a hydraulic or pneumatic aerospace actuator and the piston is moved between the retraction-limited position and the extension-limited position by hydraulic or pneumatic pressure of oil or air, and
    the aerospace actuator further comprises a seal interposed between the actuator housing and the piston.

3. The aerospace actuator according to claim 1, wherein:
    the piston comprises a shaft and a shoulder extending outwardly from the shaft, and
    the shoulder impinges against the retraction-limiting surface at the retraction-limited position and against the extension-limiting surface at the extension-limited position.

4. The aerospace actuator according to claim 1, wherein the first adjustable engagement unit further comprises a first adjustment limiter to define a maximum of the first distance.

5. The aerospace actuator according to claim 1, wherein the second adjustable engagement unit further comprises a second adjustment limiter to define a maximum of the second distance.

6. A method of installing the aerospace actuator according to claim 1 in a system, the method comprising:
    assembling the aerospace actuator to comprise the actuator housing, the second and third parts respectively comprising the retraction-limiting and the extension-limiting surfaces and the piston movable within the actuator housing between the retraction-limited position where the piston impinges against the retraction-limiting surface and the extension-limited position where the piston impinges against the extension-limiting surface;

determining a capacity of components in the system; and matching a capacity of the aerospace actuator to the capacity of the components by adjusting at least one of the first distance between the actuator housing and the retraction-limiting surface and the second distance between the extension-limiting surface and the retraction-limiting surface, wherein:

the adjusting of the first distance is independent of the adjusting of the second distance, and the adjusting of the second distance is independent of the adjusting of the first distance.

7. The method according to claim 6, wherein the adjusting of the at least one of the first distance and the second distance comprises a manual adjustment.

8. The method according to claim 6, wherein the adjusting of the at least one of the first distance and the second distance comprises an electromechanical adjustment.

9. The method according to claim 6, wherein the adjusting of the at least one of the first distance and the second distance comprises:

setting the first distance at one of a baseline first distance and an alternative first distance in accordance with ambient temperature conditions; and setting the second distance at one of a baseline second distance and an alternative second distance in accordance with the ambient temperature conditions.

10. The method according to claim 6, further comprising readjusting the at least one of the first distance and the second distance in accordance with ambient conditions.

11. An aerospace actuator, comprising:

an actuator housing comprising a first exterior surface and first exterior threading disposed on the first exterior surface;

a second part comprising a retraction-limiting surface, a first interior surface, first interior threading disposed on the first interior surface, a second exterior surface and second exterior threading disposed on the second exterior surface, both the second exterior surface and the second exterior threading being outside of both the first interior surface and the first interior threading;

a third part comprising an extension-limiting surface, a second interior surface and second interior threading disposed on the second interior surface;

a piston movable within the actuator housing between a retraction-limited position where the piston impinges against the retraction-limiting surface and an extension-limited position where the piston impinges against the extension-limiting surface; and a stroke limiting device comprising:

a first automatic adjustable engagement unit comprising an engagement of the first exterior threading and the first interior threading to which a first electromechanical motor is coupled to automatically adjust a first distance between the actuator housing and the retraction-limiting surface; and a second automatic adjustable engagement unit comprising an engagement of the second exterior threading and the second interior threading to which a second electromechanical motor is coupled to automatically adjust a second distance between the extension-limiting surface and the retraction-limiting, wherein:

an adjustment of the first distance by the first automatic adjustable engagement unit is independent of an adjustment of the second distance by the second automatic adjustable engagement unit, and the adjustment of the second distance by the second adjustable engagement unit is independent of the adjustment of the first distance by the first adjustable engagement unit.

12. The aerospace actuator according to claim 11, wherein:

the aerospace actuator is a hydraulic or pneumatic aerospace actuator and the piston is moved between the retraction-limited position and the extension-limited position by hydraulic or pneumatic pressure of oil or air, and the aerospace actuator further comprises a seal interposed between the actuator housing and the piston.

13. The aerospace actuator according to claim 11, wherein:

the piston comprises a shaft and a shoulder extending outwardly from the shaft, and the shoulder impinges against the retraction-limiting surface at the retraction-limited position and against the extension-limiting surface at the extension-limited position.

14. The aerospace actuator according to claim 11, wherein at least one of the first electromechanical motor and the second electromechanical motor comprises at least one of a rotary motor and a solenoid.

15. The aerospace actuator according to claim 11, further comprising a controller disposed in signal communication with the first and second electromechanical motors and configured to control respective operations of the first and second electromechanical motors.

* * * * *